United States Patent
Koros et al.

(10) Patent No.: US 8,664,335 B2
(45) Date of Patent: Mar. 4, 2014

(54) THERMALLY CROSSLINKED POLYMERIC COMPOSITIONS AND METHODS OF MAKING THE SAME

(75) Inventors: William John Koros, Atlanta, GA (US); Adam Michal Kratochvil, St. Louis, MO (US)

(73) Assignee: Georgia Tech Research Corporation, Atlanta, GA (US)

( * ) Notice: Subject to any disclaimer, the term of this patent is extended or adjusted under 35 U.S.C. 154(b) by 227 days.

(21) Appl. No.: 12/999,009

(22) PCT Filed: Jun. 16, 2009

(86) PCT No.: PCT/US2009/047535
§ 371 (c)(1),
(2), (4) Date: Jan. 25, 2011

(87) PCT Pub. No.: WO2010/005734
PCT Pub. Date: Jan. 14, 2010

(65) Prior Publication Data
US 2011/0269915 A1   Nov. 3, 2011

Related U.S. Application Data

(60) Provisional application No. 61/061,838, filed on Jun. 16, 2008.

(51) Int. Cl.
*C08G 63/44* (2006.01)
*C08G 73/10* (2006.01)
*C08L 79/04* (2006.01)

(52) U.S. Cl.
USPC ............ 525/180; 525/420; 525/432; 525/436

(58) Field of Classification Search
USPC .................................. 525/180, 420, 432, 436
See application file for complete search history.

(56) References Cited

U.S. PATENT DOCUMENTS

| 3,533,997 | A | * | 10/1970 | Angelo ......................... 525/436 |
| 3,876,617 | A |   | 4/1975 | Caporiccio et al. |
| 4,142,870 | A | * | 3/1979 | Lovejoy ......................... 51/298 |
| 4,882,057 | A |   | 11/1989 | Morgan et al. |
| 4,923,901 | A |   | 5/1990 | Koester et al. |
| 2007/0004228 | A1 | * | 1/2007 | Hatanaka et al. ............. 438/780 |
| 2012/0248384 | A1 | * | 10/2012 | van de Wetering et al. .. 252/507 |

FOREIGN PATENT DOCUMENTS

WO   2006136135   12/2006
WO   2010005734   1/2010

OTHER PUBLICATIONS

Office Action issued by The State Intellectual Property Office of the People's Republic of China dated Feb. 20, 2012 for related Chinese Application No. 2012021500117330.
International Search Report and Written Opinion dated Sep. 8, 2009 for PCT Application No. PCT/US2009/047535.
Office Action issued by The State Intellectual Property Office of the People's Republic of China dated Sep. 19, 2012 for related Chinese Application No. 200980122629.0.

* cited by examiner

*Primary Examiner* — Ana Woodward
(74) *Attorney, Agent, or Firm* — Troy S. Kleckley; Ryan A. Schneider, Esq.; Troutman Sanders LLP (57) ABSTRACT

The various embodiments of the present disclosure relate generally to thermally crosslinked polymeric compositions and methods of making thermally crosslinked polymeric compositions. An embodiment of the present invention comprises a composition comprising: a first polymer comprising a first repeat unit, the first repeat unit comprising a carboxyl group, wherein the first polymer crosslinks to a second polymer formed from a second repeat unit, and wherein the first polymer crosslinks to the second polymer without formation of an ester group.

14 Claims, 5 Drawing Sheets

THERMALLY CROSSLINKED POLYMERIC COMPOSITIONS AND METHODS OF MAKING THE SAME

CROSS-REFERENCE TO RELATED APPLICATIONS

This application, filed under 35 U.S.C. §371, is a U.S. National Stage Application of International Patent Application Serial No. PCT/US2009/047535, filed 16 Jun. 2009, entitled Thermally Crosslinked Polymeric Compositions and Methods of Making the Same, which claims, under 35 U.S.C. §119(e), the benefit of U.S. Provisional Application Ser. No. 61/061,838, filed 16 Jun. 2008, the entire contents and substance of which are hereby incorporated by reference as if fully set forth below.

STATEMENT REGARDING FEDERALLY SPONSORED RESEARCH

This invention was made with U.S. Government support under Grant No. DE-FG03-95ER14538 awarded by the United States Department of Energy. The U.S. Government has certain rights in the invention.

TECHNICAL FIELD OF THE INVENTION

The various embodiments of the present disclosure relate generally to thermally crosslinked polymeric compositions and methods of making thermally crosslinked polymeric compositions. More particularly, the various embodiments of the present invention are directed to thermally crosslinked polyimide compositions and methods of thermally crosslinking polyimide compositions.

BACKGROUND OF THE INVENTION

The United States produces about 20 trillion scf/year of natural gas that generates more than $100 billion annually in sales and provides crucially needed energy resources. According to the most recent International Energy Outlook, natural gas is the fastest growing energy source and worldwide consumption is expected to increase 92% by 2030. However, nearly all natural gas requires some type of treatment to reduce contaminants. The most abundant contaminant, carbon dioxide ($CO_2$), has typical concentrations between 5-25 mol %, while some reservoirs contain levels even above 50%. In order to meet pipeline specifications for transport and to minimize pipeline corrosion, the carbon dioxide concentration must be reduced to less than about 2%. Other applications within the natural gas industry involving the removal of carbon dioxide include recovery and recycling of carbon dioxide in enhanced oil/gas recovery, recovery of methane from landfills and biogas, and recovery of carbon dioxide from flue gases. Membrane-based separation processes offer an attractive alternative to traditional absorption processes due to their relatively low capital and operational costs, portability, scalability, and environmental security.

Membranes are relatively simple devices that can act effectively as "molecular filters" for gas molecules. More fundamentally, gas transport through a polymer medium occurs through a combined mechanism known as "solution-diffusion." A penetrant from a feed stream sorbs at the surface of the upstream side of the membrane and then diffuses through the membrane film to the downstream surface where it desorbs into the permeate stream. The driving force for this process is related to the change in partial pressure or fugacity of a penetrant between the feed and permeate streams.

To complicate matters, strongly sorbing species, such as $CO_2$, swell polymer membranes and cause "plasticization" of the membrane, which refers to an increase in permeability due to enhanced polymer segmental mobility. This increased local segmental mobility reduces the size and shape of the discriminating capabilities of the polymer, thereby undermining the separation efficiency of the membrane.

Accordingly, there is a need for thermally crosslinked polymeric compositions and methods of making the same to reduce $CO_2$-based, swelling-induced plasticization of membranes. It is to the provision of such thermally crosslinked polymeric compositions and methods of making the same that the various embodiments of the present invention are directed.

BRIEF SUMMARY OF THE INVENTION

Various embodiments of the present invention are directed to thermally crosslinked polymeric compositions and methods of making thermally crosslinked polymeric compositions. An aspect of the present invention comprises a composition comprising: a first polymer comprising a first repeat unit, the first repeat unit comprising a carboxyl group, wherein the first polymer crosslinks to a second polymer formed from a second repeat unit, and wherein the first polymer crosslinks to the second polymer without formation of an ester group. In such embodiments, the first polymer crosslinks to the second polymer by decarboxylation of the first repeat unit. In some embodiments of the present invention, the second repeat unit comprises a carboxyl group. In an embodiment of the present invention, the first repeat unit and the second repeat unit are the same. In such an embodiment, the first polymer and the second polymer can be the same.

The first repeat unit can comprise one or more monomers, and the second repeat unit can comprise one or more monomers. In one embodiment of the present invention, the first repeat unit comprises an imide. In another embodiment of the present invention, the first repeat unit comprises a sulfone.

In an exemplary embodiment of the present invention, the first repeat unit comprises a acid anhydride and an amine. More specifically, the acid anhydride can comprise (4,4'-hexafluoroisopropylidene)bisphthalic dianhydride, and the amine can comprise diaminomesitylene, 3,5-diaminobenzoic acid, (4,4'-hexafluoroisopropylidene)dianiline, or combinations thereof. In an exemplary embodiment of the present invention, the first repeat unit comprises wherein m is greater than or equal to one and n is greater than or equal to one. In one embodiment, the ration of m, (4,4'-hexafluoroisopropylidene)bisphthalic dianhydride and diaminomesitylene, to n, (4,4'-hexafluoroisopropylidene) bisphthalic dianhydride and 3,5-diaminobenzoic acid, is greater than or equal to 1:1. In an other embodiment, the ratio of m, (4,4'-hexafluoroisopropylidene)bisphthalic dianhydride and diaminomesitylene, to n, (4,4'-hexafluoroisopropylidene)bisphthalic dianhydride and 3,5-diaminobenzoic acid, is 2:1.

Another aspect of the present invention comprises a medium separation device comprising: a membrane configured to sorb a component of a medium, the membrane comprising a first polymer comprising a first repeat unit, the first repeat unit comprising a carboxyl group, wherein the first polymer crosslinks to a second polymer formed from a second repeat unit, and wherein the first polymer crosslinks to the second polymer without formation of an ester group. In such embodiments, the first polymer crosslinks to the second polymer by decarboxylation of the first repeat unit. In some embodiments of the present invention, the second repeat unit comprises a carboxyl group. In an embodiment of the present invention, the first repeat unit and the second repeat unit are the same. In such an embodiment, the first polymer and the second polymer can be the same.

The first repeat unit can comprise one or more monomers, and the second repeat unit can comprise one or more monomers. In one embodiment of the present invention, the first repeat unit comprises an imide. In another embodiment of the present invention, the first repeat unit comprises a sulfone.

In an exemplary embodiment of the present invention, the first repeat unit comprises a acid anhydride and an amine. More specifically, the acid anhydride can comprise (4,4'-hexafluoroisopropylidene)bisphthalic dianhydride, and the amine can comprise diaminomesitylene, 3,5-diaminobenzoic acid, (4,4'-hexafluoroisopropylidene)dianiline, or combinations thereof. In an exemplary embodiment of the present invention, the first repeat unit comprises In one embodiment of the medium separation device, the medium is natural gas and the component is carbon dioxide. The membrane may adopt many shapes and configurations. For example, in some embodiments, the membrane comprises a film, and in other embodiments, the membrane comprises a plurality of fibers. In embodiments comprising a membrane film, the film can have an average thickness greater than about 100 nanometers and less than about 50 micrometers. In embodiments comprising a plurality of fibers, a fiber can have an average longest cross-sectional dimension greater than about 50 micrometers and less than about 400 micrometers. In embodiments of the media separation device of the present invention, the membrane can demonstrate enhanced stability to plasticization as compared to a membrane comprising the first polymer and the second polymer, wherein the first polymer and the second polymer are not crosslinked.

Another aspect of the present invention comprises a method of making a thermally crosslinked polymer, comprising: providing a polymer mixture comprising a first polymer comprising a first repeat unit, wherein the first repeat unit comprises a carboxyl group, and a second polymer comprising a second repeat unit; heating the polymer mixture to a temperature sufficient to crosslink the polymers; and crosslinking the polymers to form a crosslinked polymer, wherein crosslinking the polymers does not include the formation of an ester group. In such embodiments, the first polymer crosslinks to the second polymer by decarboxylation of the first repeat unit. In some embodiments of the present invention, the second repeat unit comprises a carboxyl group. In an embodiment of the present invention, the first repeat unit and the second repeat unit are the same. In such an embodiment, the first polymer and the second polymer can be the same.

The first repeat unit can comprise one or more monomers, and the second repeat unit can comprise one or more monomers. In one embodiment of the present invention, the first and wherein m is greater than or equal to one and n is greater than or equal to one. In one embodiment, the ration of m, (4,4'-hexafluoroisopropylidene)bisphthalic dianhydride and diaminomesitylene, to n, (4,4'-hexafluoroisopropylidene) bisphthalic dianhydride and 3,5-diaminobenzoic acid, is greater than or equal to 1:1. In an other embodiment, the ratio of m, (4,4'-hexafluoroisopropylidene)bisphthalic dianhydride and diaminomesitylene, to n, (4,4'-hexafluoroisopropylidene)bisphthalic dianhydride and 3,5-diaminobenzoic acid, is 2:1.

repeat unit comprises an imide. In another embodiment of the present invention, the first repeat unit comprises a sulfone.

In an exemplary embodiment of the present invention, the first repeat unit comprises a acid anhydride and an amine. More specifically, the acid anhydride can comprise (4,4'-hexafluoroisopropylidene)bisphthalic dianhydride, and the amine can comprise diaminomesitylene, 3,5-diaminobenzoic acid, (4,4'-hexafluoroisopropylidene)dianiline, or combinations thereof. In an exemplary embodiment of the present invention, the first repeat unit comprises and wherein m is greater than or equal to one and n is greater than or equal to one. In one embodiment, the ration of m, (4,4'-hexafluoroisopropylidene)bisphthalic dianhydride and diaminomesitylene, to n, (4,4'-hexafluoroisopropylidene) bisphthalic dianhydride and 3,5-diaminobenzoic acid, is greater than or equal to 1:1. In an other embodiment, the ratio of m, (4,4'-hexafluoroisopropylidene)bisphthalic dianhydride and diaminomesitylene, to n, (4,4'-hexafluoroisopropylidene)bisphthalic dianhydride and 3,5-diaminobenzoic acid, is 2:1.

In one embodiment of the present invention, heating the polymer mixture to a temperature sufficient to crosslink the polymers comprises heating the polymer mixture to a temperature sufficient to induce decarboxylation of the first repeat unit. In one embodiment, heating the polymer mixture to a temperature sufficient to crosslink the polymers may comprise heating the polymer mixture to about 15° C. above the glass transition temperature of the polymer. In another embodiment, heating the polymer mixture to a temperature sufficient to crosslink the polymers may comprise heating the polymer mixture to about 15° C. below the glass transition temperature of the polymer. In yet another embodiment, heating the polymer mixture to a temperature sufficient to crosslink the polymers may comprise heating the polymer mixture to at least about 15° C. below the glass transition temperature of the polymer but no higher than about 15° C. above the glass transition temperature of the polymer. In an exemplary embodiment of the present invention, heating the polymer mixture to a temperature sufficient to crosslink the polymers comprises heating the polymer mixture to at least about 389° C. for about 40 minutes.

In some embodiments, a method of making a thermally crosslinked polymer can further comprise quenching the crosslinked polymer to about room temperature. In some embodiments of the present invention, providing a polymer mixture can further comprise providing a free radical generator.

Other aspects and features of embodiments of the present invention will become apparent to those of ordinary skill in the art, upon reviewing the following description of specific, exemplary embodiments of the present invention in conjunction with the accompanying figures.

DETAILED DESCRIPTION OF THE INVENTION

Gas transport through a membrane can be characterized by the permeability coefficient ($P_A$), which is defined as the pressure and thickness normalized flux across the membrane:

$$P_A = \frac{N_A \cdot l}{\Delta p_A}$$

In this equation, $N_A$ is the flux of component A through the membrane, l is the membrane thickness, and $\Delta p_A$ is the difference in partial pressure of A acting across the membrane. The units of the permeability coefficient are generally defined as Barrers according to the following relationship:

$$1 \text{ Barrer} = 10^{-10} \frac{cm^3(STP) * cm}{cm^2 * s * cmHg}$$

At low pressures, permeability decreases with increasing pressure due to the filling of Langmuir sorption sites. However, at higher pressures, the contribution of the Langmuir region to the overall permeability diminishes and gas permeability approaches a constant value associated with simple dissolution (Henry's Law) transport. This response is known as a Dual Mode permeation response. However, for more strongly sorbing and interacting penetrants like $CO_2$, the polymer eventually exhibits an upswing in the permeation isotherm due to swelling-induced plasticization. The pressure at which this upturn occurs is often referred to as the "plasticization pressure." On the molecular scale level, plasticization is believed to occur when the presence of the penetrant enhances segmental motion of the polymer chains. This increase in segmental motion allows for a greater frequency and size of transient intersegmental gaps leading to a higher diffusion coefficient. Plasticization is detrimental to gas pair separations relying upon mobility selectivity, since it enables easier diffusion of the larger penetrant with respect to the smaller penetrant.

Generally, polyimides have exceptional gas separation properties as many polyimides have both "stiff" backbones and packing-inhibited groups within the backbone creating an attractive distribution of free volume for performing subtle size and shape discrimination between similarly sized penetrants. In fact, polyimides have shown promise as a membrane material for use in aggressive feed separations, such as natural gas purification with a high $CO_2$ content, due to their robust mechanical properties, high glass transition temperatures, and resistance to chemical breakdown. However, at high pressures, $CO_2$ tends to plasticize or swell polymer membranes, which greatly diminishes the separating efficiency of the membrane. Recent work demonstrates that crosslinking a polyimide membrane with a diol crosslinking agent increases the pressure at which plasticization occurs, thus stabilizing the membrane at higher pressures of $CO_2$. The diol crosslinking agents used in this earlier work formed ester linkages through a carboxylic acid pendant group, thus preserving the imide backbone and the high gas permeabilities associated with polyimides. These ester linkages, however, can potentially be hydrolyzed in aggressive acid gas feed streams, which would reverse the effects of crosslinking and greatly reduce the efficiency of the membrane.

Therefore, a need exists for crosslinked polymeric compositions, without vulnerable ester linkages, to reduce the effects $CO_2$-based, swelling-induced plasticization of membranes. It is to the provision of such crosslinked polymeric compositions and methods of making the same that the various embodiments of the present invention are directed.

An aspect of the present invention comprises a composition comprising: a first polymer comprising a first repeat unit, the first repeat unit comprising a carboxyl group, wherein the first polymer crosslinks to a second polymer formed from a second repeat unit, and wherein the first polymer crosslinks to the second polymer without formation of an ester group.

A first polymer can comprise many polymers known in the art, including, but not limited to, polysulfones, polyimides, co-polymers thereof, or combinations thereof. In an exemplary embodiment of the present invention, the first polymer is a polyimide or a co-polymer thereof.

A second polymer can comprise many polymers known in the art, including, but not limited to, polysulfones, polyimides, co-polymers thereof, or combinations thereof. In an exemplary embodiment of the present invention, the second polymer is a polyimide or a co-polymer thereof.

In some embodiments of the present invention, the first polymer may be the same as the second polymer; however, in other embodiments of the present invention, the first polymer may be different than the second polymer.

Considering that the first polymer comprises the first repeat unit and the second polymer comprises the second repeat unit, one of ordinary skill in the art would realize that the composition of the first repeat unit determines the composition of the first polymer, and the composition of the second repeat unit determines the composition of the second polymer. Therefore, one of ordinary skill in the art would readily select the appropriate repeat unit to produce the desired polymer.

The first repeat unit can comprise one or more monomers, and the second repeat unit can comprise one or more monomers. For example, if the first polymer is a polyimide, the first repeat unit would comprise an imide. Similarly, if the first polymer was a polysulfone, the first repeat unit would comprise a sulfone. The similar principle applies to the second polymer and the second repeat unit. In some embodiments of the present invention, the repeat unit comprises one type monomer to from a homopolymer. In other embodiments of the present invention, the repeat unit comprises more than one type of monomer to form a copolymer.

In one embodiment of the present invention, the first repeat unit comprises an imide, a sulfone, or combinations thereof. In another embodiment of the present invention, the second repeat unit comprises an imide, a sulfone, or combinations thereof. In another embodiment of the present invention, the first repeat unit can comprise a carboxyl group. In another embodiment of the present invention, the second repeat unit can comprise a carboxyl group. In some embodiments, the first repeat unit may be the same as the second repeat unit; however, in other embodiments the first repeat unit may be different than the second repeat unit.

As commonly known in organic chemistry, an imide can be formed by the reaction of an amine with a carboxylic acid or an acid anhydride. Consequently, the imides of the present invention can comprise many amines, carboxylic acids and acid anhydrides known in the art. For example, an amine may comprise many amines known in the art, including, but not limited to, diaminomesitylene ("DAM"), (4,4'-hexafluoroisopropylidene)dianiline ("6FpDA"), 3,5-diaminobenzoic acid ("DABA"), m-phenylene diamine ("mPDA"), and combinations thereof, among others. An acid anhydride may comprise many acid anhydrides known in the art, including but not limited to, (4,4'-hexafluoroisopropylidene)bisphthalic dianhydride ("6FDA"), among others.

In an embodiment of the present invention, a repeat unit can comprise an amine and an acid anhydride. For example, a repeat unit can comprise 6FDA-DAM, wherein n is equal to one or more. A repeat unit can comprise 6FDA-DABA, wherein n is equal to one or more. A repeat unit can also comprise 6FDA-mPDA, wherein n is equal to one or more.

In an embodiment of the present invention, a repeat unit can comprise an acid anhydride and two or more amines. In an embodiment of the present invention, a repeat unit can comprise 6FDA-DAM:mPDA, wherein m is equal to one or more and n is equal to one or more. In another embodiment of the present invention, a repeat unit can comprise 6FDA-6FpDA:DABA, wherein in wherein m is equal to one or more and n is equal to one or more. In some embodiments m may be equal to n. In other embodiments, m may be greater than n or m may be less than n.

In an exemplary embodiment of the present invention, a repeat unit can comprise 6FDA-DAM:DABA, wherein in wherein m is equal to one or more and n is equal to one or more. In some embodiments m may be equal to n. In other embodiments, m may be greater than n or m may be less than n. In one embodiment of the present invention, the ratio of m to n is greater than or equal to 1:1. In an exemplary embodiment of the present invention, the ratio of m to n is 2:1.

Although not wishing to be bound by any particular theory, it is currently believed that the first polymer crosslinks to the second polymer by decarboxylation of the first repeat unit. For example, in the case of 6FDA-DAM:DABA, the DABA moiety comprising a free carboxyl group provides a crosslinking site. It is believed that at high temperatures the DABA moiety of the first repeat unit of the first polymer can be decarboxylated to create a phenyl radical capable of attacking portions of the second repeat unit of the second polymer, effectively crosslinking the first polymer to the second polymer. The same principle is also applicable in embodiments of the present invention where the second repeat unit of the second polymer comprises a carboxyl group.

An aspect of the present invention comprises a method of making a thermally crosslinked polymer, comprising: providing a polymer mixture comprising a first polymer comprising a first repeat unit, wherein the first repeat unit comprises a carboxyl group, and a second polymer comprising a second repeat unit; heating the polymer mixture to a temperature sufficient to crosslink the polymers; and crosslinking the polymers to form a crosslinked polymer, wherein crosslinking the polymers does not include the formation of an ester group.

As used herein, the term "mixture" can comprise a homogenous or a heterogeneous mixture and all variations in between. Thus, a mixture of a first polymer and a second polymer can comprise a homogenous mixture, a heterogeneous mixtures, or a variation therebetween.

It is well known in the art that rigid amorphous glassy polymers do not exist in thermodynamic equilibrium. Under cooling conditions, the amorphous polymer passes from a rubbery state through a glass transition temperature ($T_G$) in which long-range polymer segmental movements become drastically hindered as the polymer densifies into a solid state. As would be apparent to one of ordinary skill in the art, the $T_G$ varies based upon the composition of the polymer.

In an embodiment of the present invention, heating the polymer mixture to a temperature sufficient to crosslink the polymers comprises heating the polymer mixture to a temperature sufficient to induce decarboxylation of the first repeat unit. For example, in the case of 6FDA-DAM:DABA, decarboxylation can occur by heating the polymer to a temperature of about 350° C. to about 415° C.

In an exemplary embodiment of the present invention, heating the polymer mixture to a temperature sufficient to crosslink the polymers comprises heating the polymer mixture to about 15° C. above the $T_G$ of the polymer. For example, 6FDA-DAM:DABA has a $T_G$ of about 374° C. Thus, heating a polymer mixture comprising 6FDA-DAM:DABA to a temperature sufficient to crosslink the polymer comprises heating the polymer mixture to about 389° C.

In another embodiment of the present invention, the heating of the polymer mixture to a temperature sufficient to crosslink the polymers comprises heating the polymer mixture to about 15° C. below the $T_G$ of the polymer. Therefore, heating the polymer mixture to a temperature sufficient to crosslink the polymers can comprise heating the polymer mixture to at least about 15° C. below the $T_G$ of the polymer but no higher than about 15° C. above the $T_G$ of the polymer.

In an embodiment of the present invention, the heating of the polymer mixture to a temperature sufficient to crosslink the polymers may comprise heating the polymer mixture to temperature ranging from about 120° C. to about 200° C. In another embodiment of the present invention, the heating of the polymer mixture to a temperature sufficient to crosslink the polymers may comprise heating the polymer mixture to temperature ranging from about 180° C. to about 200° C.

The heating of the polymer mixture to a temperature sufficient to crosslink the polymers can be performed for various time periods ranging from about 5 minutes to about three days. One of ordinary skill in the art would realize that the duration of heating the polymer mixture to a temperature sufficient to crosslink the polymers is inversely proportional to the temperature of heating. Thus, as the heating temperature increases the duration of heating would decrease.

In an exemplary embodiment of the present invention, heating the polymer mixture comprising 6FDA-DAM:DABA comprises heating the polymer to at least about 389° C. for about 40 minutes.

The method of making a thermally crosslinked polymer may further comprise quenching the crosslinked polymer to about room temperature. As used herein, the term "room temperature" refers to temperatures ranging from about 20° C. to about 30° C.

The method of making thermally crosslinked polymers may further comprise providing a free radical generator to the mixture of the first polymer and the second polymer to facilitate the generation of free radicals to promote crosslinking. A free radical generator can comprise many free radical generators known in the art, including, but not limited to, dibenzoyl peroxide (BPO), azobisisobutyronitrile (AIBN), dicumyl peroxide (DCP), bibenzoyl, potassium persulfate, and combinations thereof, among others. Although not wishing to be bound by any particular theory, the presence of a free radical generator to in the mixture of the first polymer and the second polymer permits the use of lower temperatures to induce thermal crosslinking as opposed to the temperature necessary to induce thermal crosslinking of the first polymer and second polymer in the absence of the free radical generator.

Another aspect of the present invention comprises a medium separation device comprising: a membrane configured to sorb a medium, the membrane comprising a first polymer comprising a first repeat unit, the first repeat unit comprising a carboxyl group, wherein the first polymer crosslinks to a second polymer formed from a second repeat unit, and wherein the first polymer crosslinks to the second polymer without formation of an ester group.

The term "medium" is used herein for convenience and refers generally to many fluids, liquids, gases, solutions, suspensions, powders, gels, dispersions, slurries, emulsions, vapors, flowable materials, multiphase materials, or combinations thereof. A medium can encompass many media, including, but not limited to, air, water, fuels, chemicals, petrochemicals, soil, flue gas, natural gas, fuel gas, bio gas, town gas, waste gas, coal gas, or a carbon dioxide-containing fluid. A medium can comprise a mixture of a plurality of components. The term "plurality" as used herein refers to more than one. A medium can comprise a plurality of components, including but not limited to, carbon dioxide, hydrogen, nitrogen, oxygen, boron, arsenic, salt, water, minerals, other impurities, or combinations thereof.

In an exemplary embodiment of the present invention, the medium separation device is configured to separate $CO_2$ from natural gas. In another exemplary embodiment of the present invention, the medium separation device can be configured to separate hydrogen sulfide ($H_2S$) from natural gas. In yet another exemplary embodiment of the present invention, the medium separation device can be configured to capture of $CO_2$ from air. The thermally crosslinked compositions and related devices of the present invention can be adapted for use with many aggressive swelling agents.

As used herein, the term "sorb" refers to the process of adsorption, absorption or combinations thereof.

A membrane of the medium separation device can be adapted to many configurations useful for the separation of media, such as a film, a fiber, or a plurality of fibers, among others. Regardless of configuration, a membrane comprising the thermally crosslinked polymers of the present invention demonstrates enhanced stability to plasticization. The phrase "enhanced stability to plasticization" is a relative term for the performance of the thermally crosslinked polymeric compositions of the present invention as compared to similar polymeric compositions that have not been thermally crosslinked in accordance with the methods of the present invention. The stabilized membranes of the present invention show improved resistance to loss in selectivity for component A vs. B with selectivity measured by the permeability of A, $P_A$, divided by the permeability of B, $P_B$. The enhancement ratio, ER, of the stabilized membrane selectivity $(P_A/P_B)^*$, divided by the unstabilized membrane selectivity $(P_A/P_B)$, (i.e., ER= $[(P_A/P_B)^*]/[(P_A/P_B)]$) can be at least about 1.1, or can be at least about 1.2.

As used herein, a "film" comprises a layer of crosslinked polymeric material. A film can have an average thickness of about less than 100 micrometers (µm). In an exemplary embodiment of the present invention, a film can have an average thickness of about 25 µm to about 50 µm. Alternatively, a film can have an average thickness of about 100 nanometers (nm) to about 1 µm.

As used herein, a "fiber" means a continuous, flexible, filamentous material having a relatively high aspect ratio (i.e., ratio of length to average longest cross-section). In an embodiment of the present invention, an aspect ratio can be at least about 4:1. In an embodiment of the present invention, an aspect ratio can be at least about 10:1, at least about 100:1, or at least about 1000:1. In an embodiment of the present invention, a fiber has an average longest cross-sectional dimension of at least about 50 µm, or at least about 100 µm, or at least about 150 µm, or at least about 300 µm, or at least about 400 µm. As used herein, the term "plurality of fibers" refers to two or more fibers.

A fiber comprises a core. The fibers of the present invention can be a solid fiber or a hollow fiber. A hollow fiber is similar to a solid fiber; however, a hollow fiber has a lumen disposed within the fiber. Regardless of configuration, the core of the fiber operates to sorb a component of the medium. In an exemplary embodiment of the present invention, the core of the fiber sorbs $CO_2$ from natural gas. The core of the fiber may comprise the thermally crosslinked materials of the present invention.

In embodiments of the present invention comprising a hollow fiber, a material may be disposed within the lumen of the hollow fiber to form a bore. A bore effectively operates to mechanically support the core. A bore of a fiber may comprise the thermally crosslinked material of the present invention. In some embodiments of the present invention, the core and the bore of the fiber may comprise the same or similar thermally crosslinked polymeric materials. Such embodiments are often referred to in the art as monoliths.

In other embodiments of the present invention, the bore of the fiber may comprise a thermally crosslinked material of the present invention, whereas the core of the fiber comprises a different material. It is well within the scope of this invention that the thermally crosslinked polymeric material of the present invention can be used as a support for a hollow fiber (i.e., the bore). Therefore, sorbent fibers having a selected chemical composition but lacking a desired mechanical integrity can be supported by the compositions of the present invention.

The concept of providing a support structure to a fiber is also applicable in the case of membrane films. The thermally crosslinked polymeric compositions of the present invention may be used to provide a support structure to a membrane film. For example, a support layer can comprise a layer of thermally crosslinked material having an average thickness of about 100 μm.

In some embodiments of the present invention, a fiber may further comprise a sheath surrounding at least a portion of the fiber. The sheath forms a selective skin surrounding a portion of the fiber and may permit the separation of the components of the medium. The sheath may comprise many polymers known in the art, including, but not limited to, polysulfones, polyimides, co-polymers thereof, or combinations thereof. For example, a sheath may comprise 6FDA-DMA:DABA.

It must be noted that, as used in this specification and the appended claims, the singular forms "a", "an", and "the" include plural referents unless the context clearly dictates otherwise.

All patents, patent applications and references included herein are specifically incorporated by reference in their entireties.

Throughout this description, various components may be identified as having specific values or parameters, however, these items are provided as exemplary embodiments. Indeed, the exemplary embodiments do not limit the various aspects and concepts of the present invention as many comparable parameters, sizes, ranges, and/or values may be implemented. It should be understood, of course, that the foregoing relates only to exemplary embodiments of the present invention and that numerous modifications or alterations may suggest themselves to those skilled in the art without departing from the spirit and the scope of the invention as set forth in this disclosure.

The present invention is further illustrated by way of the examples contained herein, which are provided for clarity of understanding. The exemplary embodiments should not be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

Therefore, while embodiments of this invention have been described in detail with particular reference to exemplary embodiments, those skilled in the art will understand that variations and modifications can be effected within the scope of the invention as defined in the appended claims. Accordingly, the scope of the various embodiments of the present invention should not be limited to the above discussed embodiments, and should only be defined by the following claims and all equivalents.

EXAMPLES

Example 1

Decarboxylation-Induced Crosslinking of Polyimide for Enhanced $CO_2$ Plasticization Resistance It is known that polyimides have exceptional gas separation properties. Selected members in this family that have both "stiff" backbones and packing-inhibited groups within the backbone create an attractive distribution of free volume for performing subtle size and shape discrimination between similarly sized penetrants. Polyimides have shown promise as a membrane material for use in aggressive feed separations, such as natural gas purification with a high $CO_2$ content, due to their robust mechanical properties, high glass transition temperatures, and resistance to chemical breakdown. However, at high pressures, $CO_2$ tends to plasticize, or swell, polymer membranes, which greatly diminishes the separating efficiency of the membrane. Recent work demonstrates that crosslinking a polyimide membrane increases the pressure at which plasticization occurs, thus stabilizing the membrane at higher pressures of $CO_2$.[1-3] The diol crosslinking agents used in this earlier work formed ester linkages through a carboxylic acid pendant group thus preserving the imide backbone and the high gas permeabilities associated with polyimides However, these ester linkages can potentially be hydrolyzed in aggressive acid gas feed streams which would reverse the effects of crosslinking and greatly reduce the efficiency of the membrane.

In this Example, the same carboxylic acid containing base polyimide from the previous work is used; however, the discovery of a novel crosslinking approach is presented, which results in a covalently crosslinked polymer that lacks these vulnerable ester linkages. Although not wishing to be bound by any particular theory, it is believed that this novel crosslinking mechanism occurs through the decarboxylation of the acid pendant at high temperatures and creates free radical sites capable of crosslinking without the diol crosslinking agent used in previous work.

Materials and Methods. The copolyimide used in this work is 6FDA-DAM:DABA (2:1), shown in below, and is further referred to as the 'free acid' polymer due to the open carboxylic acid groups on the DABA moiety.

Packing inhibitions due to the DAM moiety provide considerable free volume, which enhances the productivity of the membrane for natural gas separations. On the other hand, the DABA moiety provides a carboxylic acid pendant group, which can be used to crosslink the polymer. This polyimide was synthesized through a two-step polycondensation reaction. In the first step, stoichiometric amounts of the three monomers were added to NMP at room temperature to make a 20 wt % solution. This solution was stirred at room temperature for 18 hours to produce the polyamic acid. The second step involves heating the highly viscous solution to 200° C. for 24 hours to close the imide ring and complete the imidization of the polymer. At the beginning of this step, orthodichlorobenzene was added to the solution and allowed to reflux into a Dean Stark trap to facilitate the removal of water which can cleave the amide bond and reduce molecular weight. Great care was taken to remove water from all aspects of the synthesis to further the reactions and prevent chain scissioning. This was done through drying all chemicals over dried molecular sieves, drying the monomer before addition, flaming and purging all glassware, and maintaining a pure $N_2$ purge during all steps of the reactions. IR spectroscopy confirmed the elimination of the amide peak following the thermal imidization procedure. Once imidization was complete, the solution was precipitated into a 50/50 water/methanol mixture to phase separate the polymer. The polymer was then blended and washed multiple times with the water/methanol solution at room temperature to remove as much NMP as possible.

Thick, dense polymer films were solution cast into a Teflon® mold in a controlled environment glove bag. The glove bag was purged with pure nitrogen for 15 minutes to remove water and then saturated with THF from an open jar within the bag for 15 minutes. A 5 wt % polymer solution in THF was then filtered with a syringe through a 0.20 µm PTFE filter into the mold. The mold was covered with a glass dish to reduce the rate of THF evaporation. Approximately 24 hours later, the film was vitrified and could be removed from the glove bag. Film thicknesses for this study were approximately 50 µm. Gas permeation measurements in this work were acquired using constant-volume, variable-pressure systems which were operated at 35° C.

Figure 1:
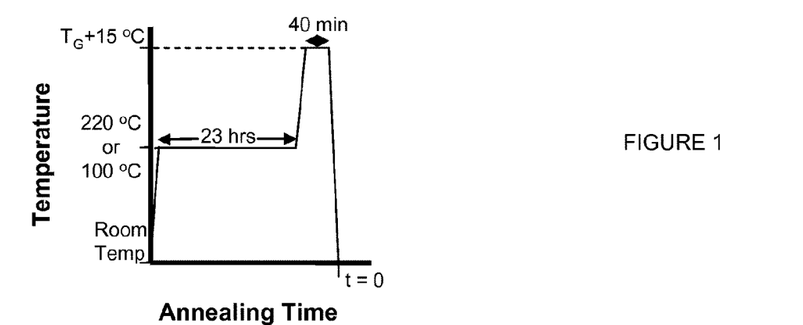
FIG. 1 graphically depicts thermal annealing profiles for the 6FDA-DAM:DABA (2:1) films.

Polymer film samples for gas permeation and solvent dissolution tests were annealed above the glass transition temperature using a controlled procedure and environment. The glass transition temperature for this copolyimide was determined to be 374° C. from differential scanning calorimetry measurements, which agrees well with literature values for this same polymer. Because the glass transition temperature is so high, a Thermcraft split-tube furnace was outfitted with an internal thermocouple for temperature control and a helium purge to create an inert annealing environment. The furnace tube was purged with at least 10 times its volume prior to thermal annealing, and the helium purge was maintained at approximately 50 standard cubic centimeters per minute during the annealing process. All samples were annealed in a free-standing state by hanging the sample with copper wire from a stainless steel support. The thermal annealing procedures, shown in FIG. 1, include a sub-$T_G$ drying step at either 100° C. (referred to as annealing protocol #1) or 220° C. (referred to as annealing protocol #2) for 23 hours to remove any residual solvent followed by a rapid ramp to 15 degrees above $T_G$ (389° C.) for 40 minutes. At the 40 minute mark, the films were rapidly quenched to room temperature through immediate removal from the furnace, which took approximately 2 to 4 seconds.

Examination of the polymer during the annealing process was conducted using thermogravimetric analysis with the ability to be coupled with IR for evolved gas determination. The TGA was a Netzsch STA 409PC instrument, and all samples were run under an inert $N_2$ purge of 30 mL/min The temperature profiles are displayed with the mass loss data. For IR measurements, a Bruker Tensor 27 with a resolution of 4 cm$^{-1}$ and at least 64 scans was used to measure either polymer samples or evolved gases from the TGA.

Fluorescence spectroscopy and solid-state carbon NMR were employed to examine the polymer following the high-temperature thermal treatment. A CRAIC 1000 spectrometer using a 50× objective at 365 nm was used for fluorescence measurements and a Bruker DSX 300 was used for NMR measurements.

Figure 2:
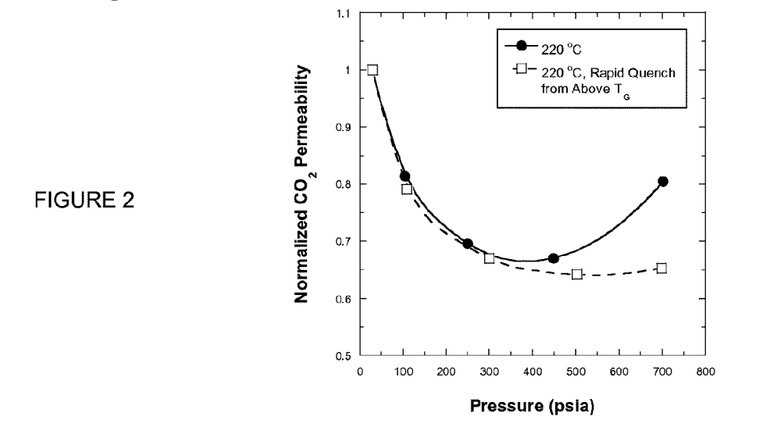
FIG. 2 shows normalized $CO_2$ permeation isotherms for 6FDA-DAM:DABA (2:1) films.

Results. Because quenching a polymer film from above $T_G$ introduces large amounts of excess free volume into the polymer matrix, gas permeabilities in the quenched film will be significantly larger than an as-cast or annealed film of the same material. Therefore, in order to compare a quenched sample with a control sample, gas permeabilities are normalized with respect to the initial permeability measurement at 2 atm. FIG. 2 displays a $CO_2$ permeability isotherm for the free acid polymer film quenched from above $T_G$ using protocol #2 and a control sample annealed at 220° C. for 23 hours. A typical plasticization response for this polymer is observed in the control sample with a plasticization pressure of 400 psia; whereas, the sample quenched from above $T_G$ exhibits enhanced plasticization resistance. To determine if this enhanced resistance is simply a result of introducing more excess free volume into the polymer, quenched samples were placed in typical solvents used for casting this polyimide into films, such as cyclohexanone, THF, and NMP. For all three solvents, none of the quenched samples redissolved. In fact, a free acid film quenched from above $T_G$ remained insoluble after boiling in NMP for 18 hours. These two responses indicate some form of crosslinking is occurring, whether physical or chemical; however, the free acid polyimide lacks the diol crosslinking agent typically used to crosslink this polymer.

There are a few possible explanations for these responses of the free acid quenched from above $T_G$ which will be explored. First, this polymer is capable of forming charge transfer complexes, which has been shown to stabilize another polyimide against plasticization. This stabilization may also lead to greater insolubility in typical solvents. From a thermodynamic standpoint, when the polymer is in the rubbery region during the annealing process, enhanced chain mobility will allow alignment of the necessary components to form these complexes which results in an energetically more favorable state. Second, thermal degradation of similar polyimides has been shown to create a carbon structure with enhanced gas separation properties. This new material should be resistant to penetrant swelling since it consists of a rigid, ultramicroporous carbon structure. The $T_G$ of the free acid is sufficiently high (374° C.) that the beginning stages of polymer degradation may be occurring which could lead to these stabilization effects. Finally, even though this free acid polymer is considered to be 'noncrosslinkable' (i.e., it does not have the glycol crosslinking agent chemically attached to the DABA acid site) the high annealing temperature may cause some form of chemical reaction or reorganization to occur which could then stabilize the polymer.

Figure 3:
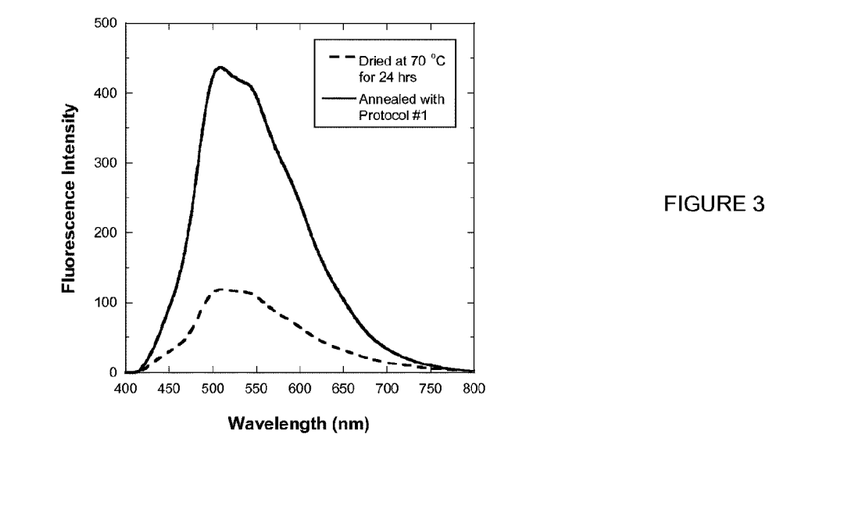
FIG. 3 demonstrates the fluorescence spectra of a dried and thermally quenched 6FDA-DAM:DABA (2:1) sample.

Investigation of Charge Transfer Complexes. FIG. 3 presents fluorescence spectra of a free acid film dried at 70° C. for 24 hours and a film annealed using protocol #1. Each curve is a representation of three different measurements per sample.

Figure 4:
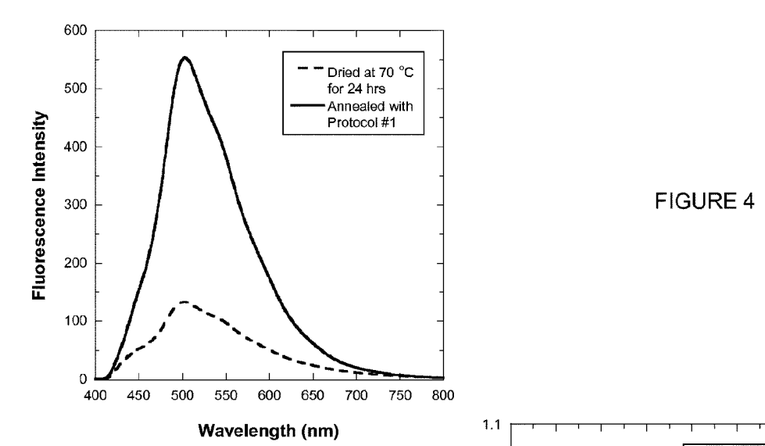
FIG. 4 illustrates the fluorescence spectra of a dried and thermally quenched 6FDA-DAM sample.

The samples used for these measurements are adjacent samples from the same cast film, and both samples were measured on the spectrometer at the same time to eliminate the issue of changes in instrument calibration over time. As a complementary measurement, a structurally similar polymer, 6I-DA-DAM, was examined with fluorescence spectroscopy in the same manner as described above with the results shown in FIG. 4, and solubility tests were performed in THF and NMP. Even though this polymer is structurally different than the free acid, rapid quench from 389° C. increased the film thickness from 33 µm to 74 µm. This response is indicative of a polymer film surpassing the glassy transition followed by a rapid quench to room temperature. Surprisingly, solubility tests revealed the 6FDA-DAM polymer to be soluble in both THF and NMP at room temperature following the high-temperature treatment.

These data reveal many insights in annealing the free acid above $T_G$. As mentioned before, when in the rubbery state, these polymers are expected to form charge transfer complexes which leads to a more favorable energy state. The fluorescence spectra for both the 6FDA-DAM:DABA (2:1) and 6FDA-DAM confirm this hypothesis as shown by the four-fold increase in fluorescence intensity when quenched from above $T_G$. Also, the 6FDA-DAM solubility in THF and NMP following thermal treatment demonstrates that charge transfer complexes are not sufficiently strong enough to stabilize these polymers against strong swelling or even dissolving in these solvents. Ultimately, these data reveal that charge transfer complexes are not the cause of the insolubility and enhanced plasticization resistance of the free acid, and the DABA moiety of the free acid is most likely responsible for these effects following the rapid quench from above $T_G$.

Investigation of Oligomer Crosslinking. Previous work has explored the ability to crosslink polyimides with both small and large molecule diamines. While the polymer film is immersed in a methanol/diamine solution at room temperature, the diamines cleave the imide ring and form an amide linkage on the polymer backbone. The opposite end of the diamine then reacts with another imide ring in a similar manner. The result is a crosslinked polymer through the newly formed amides. The purpose of the methanol is to swell the polymer to enhance the chain mobility which allows alignment for the crosslinks to form. When the large batch of 6FDA-DAM:DABA (2:1) free acid was synthesized and analyzed with GPC, a small secondary distribution existed in the low molecular weight region indicating material with a low degree of polymerization is present in the bulk polymer. Based on the polystyrene calibration, this low molecular weight material is equivalent to 1-3 repeat unit oligomers. If these small chain oligomers contain amine end groups, either DAM or DABA substituents, it is reasonable to conclude that the high temperature annealing above $T_G$ provides enough polymer mobility to form the amide crosslinks mentioned above. To test this possibility, the low molecular weight polymer was removed from a small batch of the free acid, and the remaining high molecular weight polymer was heat treated using protocol #2 and examined with solubility tests and gas permeation.

A small batch of the free acid was placed in a near-theta solvent (50/50 THF/Methanol) and mixed for 18 hours to greatly swell the polymer and dissolve the low molecular weight species. The remaining polymer was then placed in a fresh 50/50 THF/Methanol solution and mixed again for 18 hours. Once removed and dried, approximately 75% of the polymer remained. Both the washed and extracted polymer were examined with GPC to determine the efficiency of the extraction. The washed polymer contains only high molecular weight material; whereas, the extracted polymer contains a mix of high and low molecular weight material. The molecular weight values and PDI for each are presented in Table 1.

TABLE 1

| Polymer | Mn | PDI |
| --- | --- | --- |
| Washed Free Acid | 78,337 | 1.904 |
| Extracted Free Acid | 912 | 4.449 |

Figure 5:
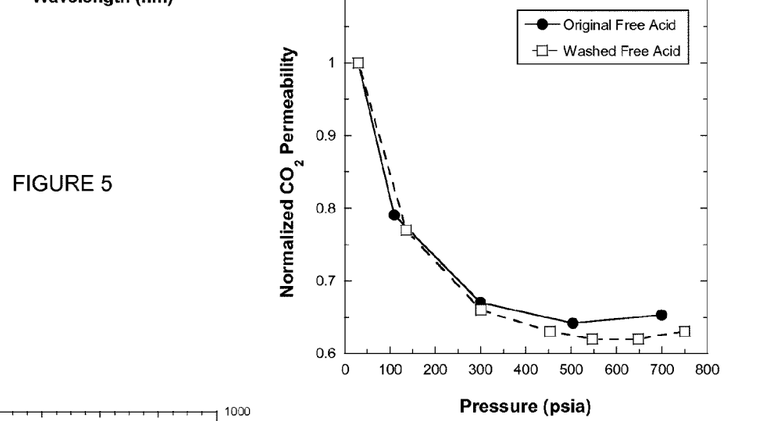
FIG. 5 shows normalized $CO_2$ permeability for the washed and original free acid polymer following rapid quenching from above $T_G$.

Upon thermal treatment with protocol #2, the high molecular weight polymer remains insoluble in both THF and NMP. Furthermore, as shown in FIG. 5, after rapid quenching from above $T_G$, the $CO_2$ plasticization resistance of the washed free acid is nearly identical to the original free acid. Therefore, the small chain oligomers that are present in the original free acid polymer are not responsible for the crosslinking effects that are observed following rapid quench from above $T_G$.

Figure 6:
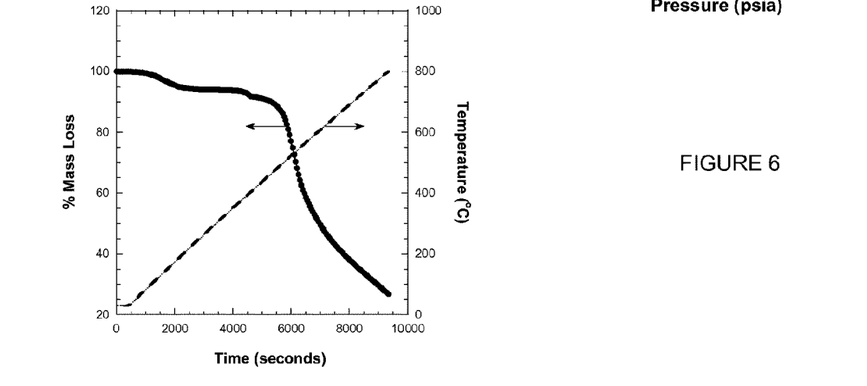
FIG. 6 shows the percent mass loss and temperature profile of TGA measurement of the 6FDA-DAM:DABA (2:1) polymer.
Figure 7:
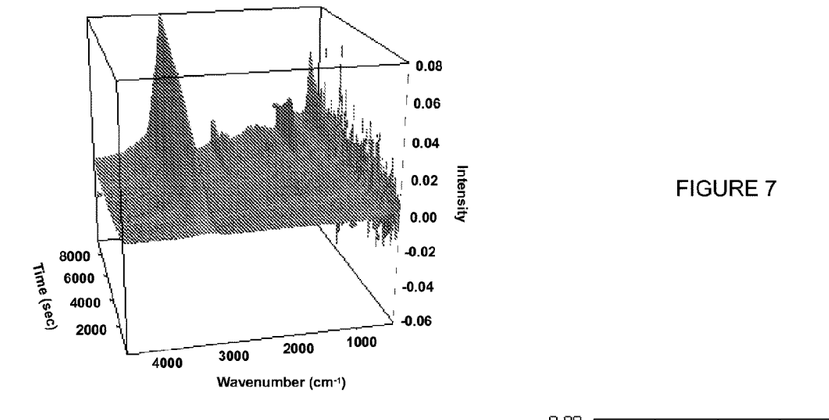
FIG. 7 provides a 3-D IR spectrum of evolved gases for the 800° C. TGA of the free acid.
Figure 8:
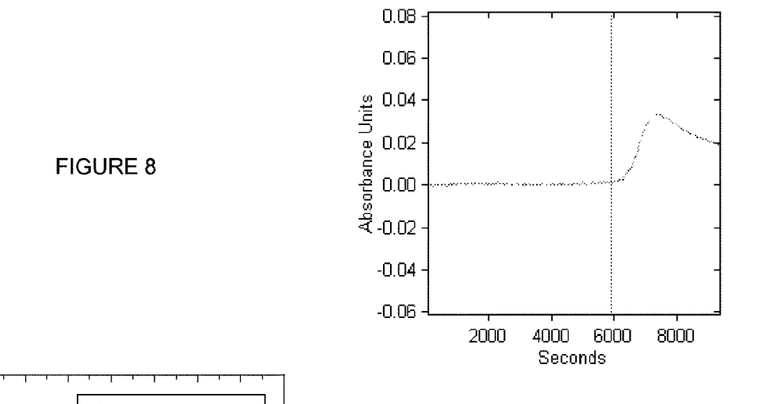
FIG. 8 shows the IR Trace of 1150 $cm^{-1}$ from the 3-D IR spectrum of FIG. 7.

Decomposition of the Free Acid. TGA measurements coupled with IR of the evolved gases were conducted on the free acid polymer to characterize the decomposition of the polymer. The temperature was ramped up to 800° C. at a rate of 5° C./min in a nitrogen purge. FIG. 6 displays the mass loss of the polymer and temperature profile of the measurement. The first mass loss begins at 80° C. and can be attributed to water evolution and possibly trace amounts of residual solvent since mass loss continues until approximately 220° C. There is also a second mass loss between 350° C. and 415° C. which will be addressed later. The significant mass loss associated with polymer decomposition begins at 470° C. FIG. 7 displays the 3-D IR spectra of gas evolution, and FIG. 8 displays the IR trace at 1150 cm$^{-1}$ which corresponds to $HCF_3$ evolution which has been determined to be one of the first byproducts of decomposition in similar polyimides. The large, growing peak at 3200 cm$^{-1}$ is a water peak associated with ice formation on the external IR detector. These spectra confirm that decomposition of the 6FDA-DAM:DABA (2:1) free acid polymer does not begin until 470° C. Since the annealing protocols only go up to 389° C., carbon formation from polymer decomposition is not responsible for the observed insolubility and plasticization resistance of the rapidly quenched free acid.

Investigation of Anhydride Formation. Previous work with polymethacrylates and poly(mono-n-alkyl itaconates) have discovered the presence of anhydride formation at carboxylic acid sites as one of the first steps of thermal degradation. These formations occur as increased chain mobility at higher temperatures allows alignment of the acid site and subsequent anhydride formation with the loss of water. Velada et al. (*Macromolecular Chemistry and Physics* 1995, 196, 3171-3185) concluded that linear, intermolecular anhydride formation was responsible for polymer crosslinking and resulting insolubility in typical solvents; and, many other studies have shown that intermolecular anhydride formation can occur in these polymers. Also, upon further heating these anhydrides have been shown to release $CO_2$ and form a ketone crosslink. The presence of the carboxylic acid site on the DABA moiety lends the possibility of these same anhydride formations to create intramolecular or intermolecular crosslinks.

Figure 9:
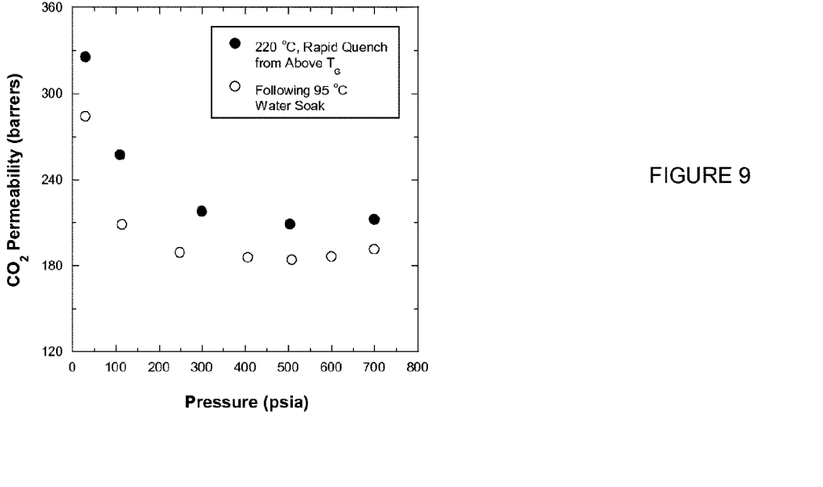
FIG. 9 shows the $CO_2$ permeation isotherm of a free acid film rapidly quenched from above $T_G$ and then conditioned overnight in 95° C. water.

Unfortunately, IR wavelengths typically associated with anhydride formation, 3600-2500, 1795, 1750, and 1022 cm$^{-1}$, are coupled with other structures in the free acid and are not independently discernible following the rapid quench from above $T_G$. Therefore, IR can not be used to detect these formations. However, the doubly conjugated benzophenone, which would result from the decomposition of the anhydride between two DABA groups, has an IR absorbance near 1680-1640 cm$^{-1}$ which is not present in the free acid spectrum. To determine if anhydride formations are occurring in the free acid, however, an experiment was performed to hydrolyze the possible anhydride and return the polymer to the previous uncrosslinked state. To do this, a previous free acid film that was rapidly quenched from above $T_G$ was placed in 95° C. water for 8 hours in an attempt to hydrolyze any crosslinks that may have formed. Following the high temperature water conditioning, a $CO_2$ permeation isotherm was performed to determine if the enhanced plasticization resistance deteriorated to the typical uncrosslinked response. FIG. 9 presents the $CO_2$ permeation results of the rapidly quenched film and the same film after the water conditioning.

The decrease in all permeabilities following water conditioning is a result of physical aging of the film. Approximately two months elapsed between the rapid quench and water treatment. This rigorous water treatment should be sufficient to hydrolyze any anhydride formation; however, the plasticization resistance following the treatment is nearly identical to that following rapid quench from above $T_G$. FIG. 2 presented the $CO_2$ permeation isotherm of an uncrosslinked free acid film, and there is a clear upswing in the $CO_2$ permeability at approximately 400 psia which is not apparent in the water treated permeation isotherm. If anhydride formation does occur without any subsequent reactions when the free acid is annealed above $T_G$, it is most likely eliminated following the rapid quench and does not play a role in the observed insolubility effects and plasticization resistance.

Figure 10:
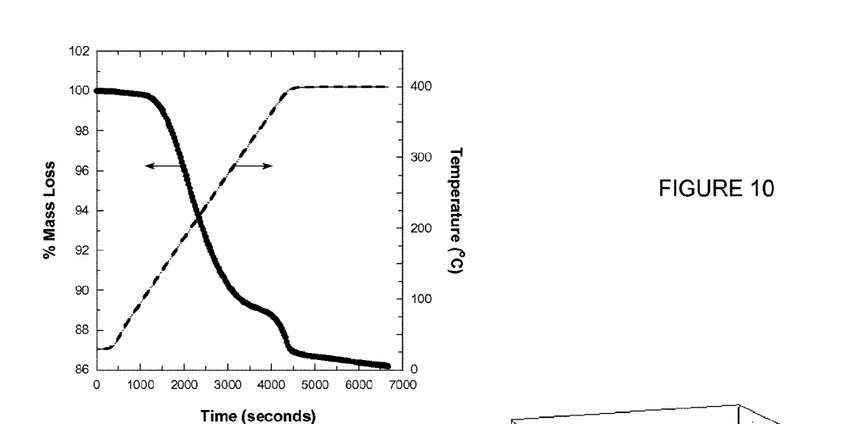
FIG. 10 demonstrates the percent mass loss and temperature profile of a free acid film to mimic the annealing protocol above $T_G$.

Decarboxylation of the DABA Moiety. FIG. 6 displayed a small mass loss in the free acid that begins at approximately 350° C. To determine if this loss occurs in a free acid film that is annealed using protocol #1, a free acid film was measured using a TGA program that mimics the annealing protocol, albeit with a slower ramp. The ramp rate was maintained at 5° C./min and the film was heated to 390° C. and held at that temperature for 40 minutes. The TGA mass loss for this run is presented in FIG. 10.

Figure 11:
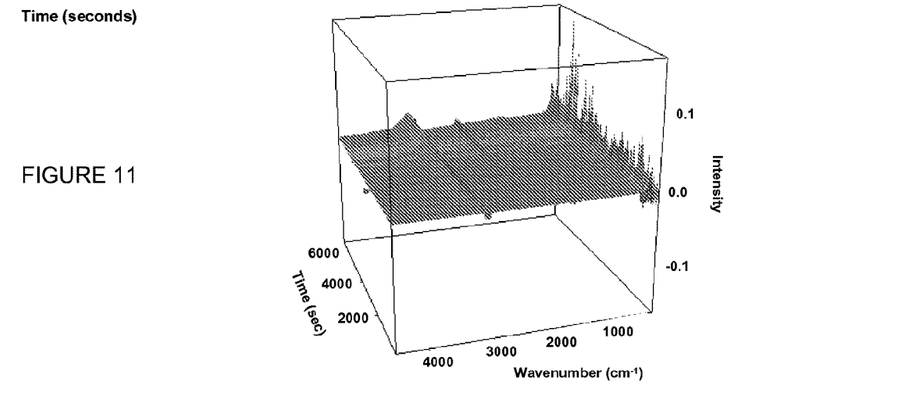
FIG. 11 provides a 3-D IR spectra of evolved gases corresponding to the TGA run in FIG. 10.
Figure 12:
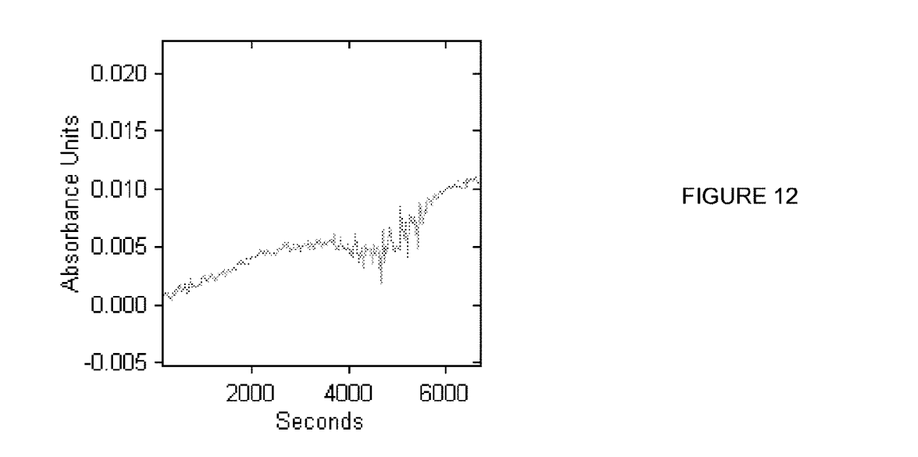
FIG. 12 shows the IR Trace of 2354 $cm^{-1}$ from the 3-D IR spectrum of FIG. 11.

This TGA profile clearly shows a mass loss at 350° C. that continues until the 390° C. isothermal stage is reached. This temperature falls in the range attributed to decarboxylation as observed in acid containing polymers such as acrylic acid and poly(p-methylacryloyloxy benzoic acid). In the decarboxylation process, $CO_2$ and/or CO are evolved in gas form. FIGS. 11 and 12 display the 3-D IR spectra of gas evolution and IR trace at 2354 cm$^{-1}$ which is associated with $CO_2$ evolution. No CO evolution was detected by IR as an evolved gas. Again, the large peak at 3200 cm$^{-1}$ is a water peak associated with ice formation on the external IR detector; however, it is still possible that water is evolved during this process and the signal is hidden within this large peak. The increase in absorbance during the first 2500 seconds in FIG. 12 is not fully understood at this time; however, it could be sorbed $CO_2$ within the polymer that is evolved as temperature increases. However, there is a distinct increase in the absorbance beginning at ~4500 seconds which corresponds to the significant mass loss that occurs between 4000 and 4500 seconds in FIG. 10. Therefore, $CO_2$ is most likely being evolved from the polymer during this portion of the thermal treatment. As a means of confirming that the carboxylic acid group is responsible for this mass loss, a TGA profile of the 6FDA-DAM polymer was conducted, and there is no mass loss prior to the major decomposition of the polymer.

Cervantes et al. (*Polymer Degradation and Stability* 2006, 91, 3312-3321) concluded that benzoic anhydride is first formed at lower temperatures and the $CO_2$ evolution that occurs at 353° C. is the result of decarboxylation of the anhydride structures. If the free acid polymer followed a similar process, the mass loss associated with removal of the complete anhydride structure from the polymer is 2.16% per 2 repeat units of the free acid (6 6FDA, 4 DAM, 2 DABA). This value takes into account water removal at lower temperatures to form the anhydride. A first derivative analysis of the TGA data in FIG. 10 confirms a mass loss of 2.0% at this step. This result substantiates the possibility that the observed mass loss at temperatures just below $T_G$ for the free acid polymer is associated with the decarboxylation of the free acid in the DABA species.

Figure 13:
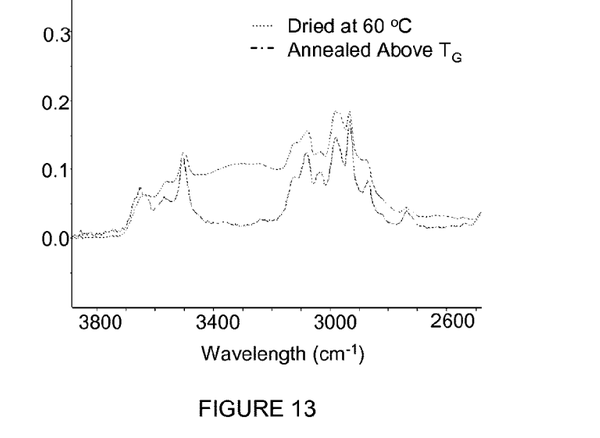
FIG. 13 provides the high-frequency IR spectra of a dried free acid film and a free acid film annealed above $T_G$.

IR spectra of a dried free acid film and a film quenched from above $T_G$ also indicate the significant loss of these acid sites. FIG. 13 displays the high-frequency range for these films, and the broad peaks in the range of 3700 to 3100 cm$^{-1}$ typically associated with OH stretching vibrations have been greatly diminished in the film annealed above $T_G$. This broad peak range is not just a result of sorbed water in the polymer since the film annealed above $T_G$ was rapidly quenched to room conditions and was not measured with IR for a number of days. Therefore, it would have reached equilibrium with the environment just as the dried free acid film.

C-NMR was conducted on the free acid polymer to confirm the loss of the carboxylic acid carbon during the heat treatment above $T_G$. A free acid sample dried at 220° C. was compared to a sample thermally treated using protocol #2. All chemical shift assignments were determined using ChemDraw® software. Because the absolute intensities of the spectra are not equivalent, all data analysis is conducted with respect to the aromatic/$CF_3$ peaks of the polymer in the range of 150-105 ppm. The peak of interest is the carbonyl carbon band in the range of 170-160 ppm, which comprises the carboxylic acid carbons as well as the imide carbonyl carbons. An integral analysis of the peaks confirms a reduction in the carbonyl carbon peak following annealing above $T_G$. To ensure this technique is accurate, peak integral analyses for the quaternary carbon attached to the $CF_3$ groups and the methyl carbons from the DAM diamine with respect to the aromatic/$CF_3$ peak were also measured. These results are displayed in Table 2.

TABLE 2

| C-NMR Peak | 220° C. | 220° C., Quench from Above $T_G$ | Percent Change |
|---|---|---|---|
| Carbonyl Carbon (173-160 ppm) | 0.192 | 0.161 | 16.1% |
| Quaternary Carbon (69-53 ppm) | 0.084 | 0.083 | 1.2% |
| Methyl Carbon (22-2 ppm) | 0.300 | 0.305 | −1.6% |

Since there is one carboxylic acid carbon and eight imide carbonyl carbons in a repeat unit, the theoretical loss for complete decarboxylation is only 11.1%. While it is not possible to definitively determine the uncertainty associated with this measurement technique, the percent change of the quaternary carbon and methyl carbon peaks sheds some light on the uncertainty of these measurements. At the very least, this technique establishes the fact that a C=O carbon is being removed from the polymer structure when the free acid polymer is annealed above $T_G$.

Mechanism of Covalent Crosslinking of the Free Acid. Decarboxylation studies of aromatic carboxylic acids have been performed in the past to gain an understanding of how the process occurs and if it can lead to crosslinking during the thermal processing of low rank coals. In one study using a neutral environment, Eskay et al. (*Energy & Fuels* 1996, 10, 1257-1261) conclude that the crosslinking of a model acid occurs through anhydride formation and subsequent decomposition to form aryl radicals which the crosslink with the naphthalene solvent. In fact, thermolysis of the model anhydride in naphthalene, yielded 57% crosslinked products with a decomposition rate of 88% hr$^{-1}$ at 400° C. Interestingly, there was no crosslinked product created from two model acids forming a bond at the open radical sites. Based on the reaction products and gas byproducts, Eskay et al. (*Energy & Fuels* 1997, 11, 1278-1287) concluded that the decomposition of the anhydride was most likely induced by a radical and not a result of homolysis of the C(=O)—O bond.

As shown earlier, the amount of mass loss in the 6FDA-DAM:DABA (2:1) free acid polymer at 350° C. is slightly below the theoretical amount of complete removal of the anhydride formation across two DABA species. With the known pathway to crosslinking shown to occur in the model acid described above, it is reasonable to conclude that the high temperature treatment of the 6FDA-DAM:DABA (2:1) free acid polymer produces a crosslinked polymer in which the acid site of the DABA group is arylated to another portion of the polymer backbone. This crosslinking most likely occurs in a few different places along the backbone. If the proposed induced decomposition pathway of the anhydride holds true, then a hydrogen must be abstracted from the backbone. The hydrogens in the DAM methyl groups have the lowest bond dissociation energy, and are therefore most likely to be abstracted which then creates a methyl radical and possible crosslinking site. Conversely, even though Eskay et al. did not observe any crosslinked model acids, it may be possible for two radical DABA groups to form linkage and corresponding biphenyl. One other possibility exists as a potential crosslinking point. The gradual mass loss at 389° C. from 4500 seconds to 6500 seconds in FIG. 5.9 may be the onset of decomposition caused by HCF$_3$ loss. A similar TGA experiment was conducted with a maximum temperature of 450° C. In this run, the gradual mass loss at the isothermal step was slightly enhanced, and the IR spectrum of evolved gases exhibited a small peak at 1149 cm$^{-1}$ which is indicative of HCF$_3$ evolution. Therefore it is possible that a small amount of the CF$_3$ groups are being cleaved at 389° C. The leaving CF$_3$ group would then provide an available radical site for crosslinking. While this structure appears to be too sterically hindered to form, there have been studies conducted with a structurally similar polymer. The structures of these proposed crosslinking sites are shown below, where A shows a crosslinking site through the DAM methyl, B shows a biphenyl crosslink, and C shows the cleaved CF$_3$ site.

-continued

C

Figure 14:
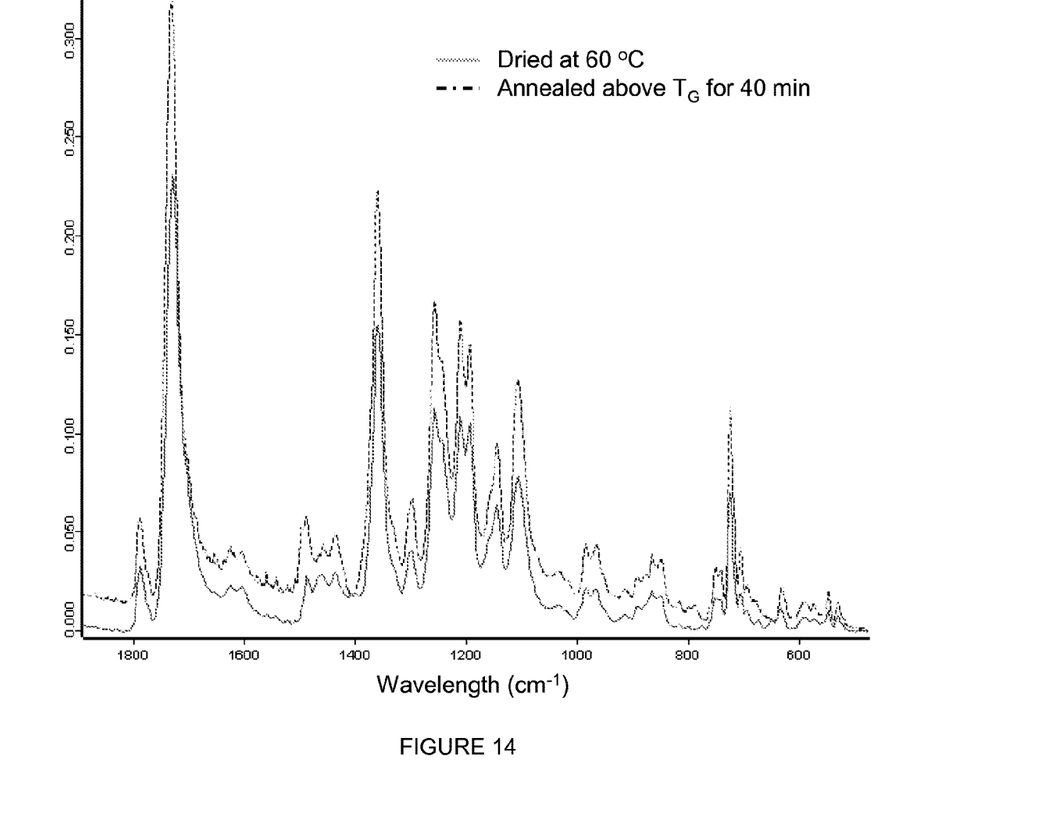
FIG. 14 provides IR spectra comparing the free acid before and after annealing above $T_G$.

These proposed points of crosslinking would not significantly alter the IR signature of the polymer, which is consistent with what is observed as shown in FIG. 14. The only substantial difference between these spectra is the diminished peak at 1400 cm$^{-1}$ in the film annealed above $T_G$. While this peak is not definitively known, it may be the OH in-plane deformation of carboxyl dimers which ranges from 1440-1395 cm$^{-1}$.[28]

Conclusions. Upon rapid quenching from above $T_G$, the 6FDA-DAM:DABA (2:1) free acid polymer exhibits unusual responses for a polymer simply annealed above $T_G$. The polymer becomes insoluble in strong solvents and exhibits excellent plasticization resistance in $CO_2$ indicating some form of crosslinking has occurred. Charge transfer complexes, oligomer crosslinking, anhydride crosslinking, and bulk decomposition are all dismissed as possible causes for these observed responses. TGA-IR and C-NMR measurements confirm the free acid in the polymer undergoes decarboxylation just prior to reaching the $T_G$. The subsequent aryl radicals then crosslink with a few proposed sites along the polymer backbone. The resulting aliphatic and aryl crosslinks provide a much more robust polymer material for membrane separations.

REFERENCES

Wind, J. D.; Staudt-Bickel, C.; Paul, D. R.; Koros, W. J.; *Macromolecules* 2003, 36, 1882-1888.

Wind, J. D.; Staudt-Bickel, C.; Paul, D. R.; Koros, W. J.; *Industrial & Engineering Chemistry Research* 2002, 41, 6139-6148.

Wind, J. D.; Paul, D. R.; Koros, W. J.; *Journal of Membrane Science* 2004, 228, 227-236.

What is claimed is:

1. A thermally crosslinked polymeric composition comprising:
   a first polymer comprising a first repeat unit, the first repeat unit comprising a carboxyl group and an imide group,
   wherein the first polymer crosslinks to a second polymer formed from a second repeat unit, and wherein the first polymer crosslinks to the second polymer without formation of an ester group, and
   wherein the first polymer crosslinks to the second polymer by thermal decarboxylation of the first repeat unit.

2. The composition of claim 1, wherein the first repeat unit is formed by the reaction of (4,4'-hexafluoroisopropylidene) bisphthalic dianhydride and an amine.

3. The composition of claim 2, wherein the amine comprises 3,5-diaminobenzoic acid.

4. The composition of claim 3 wherein the amine further comprises diaminomesitylene, (4,4'-hexafluoroisopropylidene)dianiline, m-phenylene diamine or combinations thereof.

5. The composition of claim 4, wherein the first repeat unit comprises and wherein m is greater than or equal to one and n is greater than or equal to one.

6. The composition of claim 5, wherein the ratio of m, (4,4'-hexafluoroisopropylidene)bisphthalic dianhydride and diaminomesitylene, to n, (4,4'-hexafluoroisopropylidene) bisphthalic dianhydride and 3,5-diaminobenzoic acid, is greater than or equal to 1:1.

7. The composition of claim 1, wherein the first polymer comprises an aromatic backbone polymer.

8. The composition of claim 4, wherein the first repeat unit comprises and wherein m is greater than or equal to one and n is greater than or equal to one.

9. A method of making a thermally crosslinked polymer, comprising:
providing a polymer mixture, the mixture comprising
a first polymer comprising a first repeat unit, wherein the first repeat unit comprises a carboxyl group and an imide group, and
a second polymer comprising a second repeat unit;
heating the polymer mixture to a temperature sufficient to thermally crosslink the polymers; and
crosslinking the polymers to form a thermally crosslinked polymer, wherein crosslinking the polymers does not include the formation of an ester group and crosslinks by decarboxylation.

10. The method of claim 9, wherein the first repeat unit comprises and wherein m is greater than or equal to one and n is greater than or equal to one.

11. The method of claim 10, wherein the heating the polymer mixture to a temperature sufficient to crosslink the polymers comprises heating the polymer mixture to at least about 389° C. for about 40 minutes.

12. The method of claim 9, wherein the heating the polymer mixture to a temperature sufficient to crosslink the polymers comprises heating the polymer mixture to at least about 15° C. below the glass transition temperature of the first polymer but no higher than about 15° C. above the glass transition temperature of the first polymer.

13. The method of claim 9, further comprising quenching the crosslinked polymer to about room temperature.

14. The method of claim 9, wherein the first repeat unit comprises and wherein m is greater than or equal to one and n is greater than or equal to one.

* * * * *